(12) United States Patent
Chen et al.

(10) Patent No.: US 10,353,824 B2
(45) Date of Patent: Jul. 16, 2019

(54) DATA PROCESSING METHOD, MEMORY MANAGEMENT UNIT, AND MEMORY CONTROL DEVICE

(71) Applicant: Huawei Technologies Co., Ltd., Shenzhen (CN)

(72) Inventors: Yun Chen, Shenzhen (CN); Guangfei Zhang, Shenzhen (CN); Kunpeng Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

(21) Appl. No.: 15/612,714

(22) Filed: Jun. 2, 2017

(65) Prior Publication Data

US 2017/0270051 A1    Sep. 21, 2017

Related U.S. Application Data

(63) Continuation of application No. PCT/CN2015/075205, filed on Mar. 27, 2015.

(51) Int. Cl.
*G06F 12/1027* (2016.01)
*G06F 12/10* (2016.01)
*G06F 12/1009* (2016.01)

(52) U.S. Cl.
CPC ......... *G06F 12/1027* (2013.01); *G06F 12/10* (2013.01); *G06F 12/1009* (2013.01);
(Continued)

(58) Field of Classification Search
CPC .. G06F 12/1027; G06F 12/10; G06F 12/1009; G06F 2212/1024; G06F 2212/65; G06F 2212/68; G06F 2212/684
See application file for complete search history.

(56) References Cited

U.S. PATENT DOCUMENTS 6,665,788 B1   12/2003  Hughes
8,700,883 B1    4/2014  Glasco et al.
(Continued)

FOREIGN PATENT DOCUMENTS

CN   102132263 A   7/2011
CN   103026348 A   4/2013
(Continued)

OTHER PUBLICATIONS

Ahn, Jeongseob et al., "Revisiting Hardware-Assisted Page Walks for Virtualized Systems," IEEE 2012 39th Annual International Symposium on Computer Architecture (ISCA), Jun. 9-13, 2012, pp. 476-487.
(Continued)

*Primary Examiner* — Eric Cardwell
(74) *Attorney, Agent, or Firm* — Slater Matsil, LLP

(57) ABSTRACT

A method for processing data, a memory management unit and a memory control device are disclosed. In an embodiment, the method includes receiving, by a memory control device, a first data packet carrying a virtual address and a page table base address that are sent by a memory management unit, executing, by the memory control device, a page table walk operation according to the virtual address and the page table base address, to obtain a physical address corresponding to the virtual address and sending, by the memory control device, the physical address corresponding to the virtual address to the memory management unit.

14 Claims, 6 Drawing Sheets

(52) U.S. Cl.
CPC .. *G06F 2212/1024* (2013.01); *G06F 2212/65* (2013.01); *G06F 2212/68* (2013.01); *G06F 2212/684* (2013.01)

(56) References Cited

U.S. PATENT DOCUMENTS

| | | |
|---|---|---|
| 2007/0283125 A1 | 12/2007 | Manczak et al. |
| 2009/0135844 A1* | 5/2009 | Mukherjee .......... H04L 47/2475 370/417 |
| 2009/0157975 A1 | 6/2009 | Sathaye et al. |
| 2009/0172316 A1 | 7/2009 | Teh et al. |
| 2011/0010521 A1 | 1/2011 | Wang et al. |
| 2011/0161622 A1 | 6/2011 | Maeda et al. |
| 2011/0202724 A1 | 8/2011 | Kegel et al. |
| 2012/0331265 A1 | 12/2012 | Rozario et al. |
| 2013/0124821 A1 | 5/2013 | Mullender et al. |
| 2013/0275701 A1 | 10/2013 | Symes et al. |
| 2014/0089572 A1 | 3/2014 | Koka et al. |
| 2014/0281363 A1 | 9/2014 | Tian et al. |
| 2014/0379956 A1 | 12/2014 | Chang et al. |
| 2016/0147667 A1* | 5/2016 | Awasthi .............. G06F 12/1425 711/163 |

FOREIGN PATENT DOCUMENTS

| | | |
|---|---|---|
| CN | 103052945 A | 4/2013 |
| CN | 103116556 A | 5/2013 |
| CN | 104239238 A | 12/2014 |
| EP | 2416251 A1 | 2/2012 |
| JP | H04148352 A | 5/1992 |
| JP | H0561772 A | 3/1993 |
| KR | 20120037975 A | 4/2012 |

OTHER PUBLICATIONS

Basu, Arkaprava et al., "Efficient Virtual Memory for Big Memory Servers," ISCA'13 Proceedings of the 40th Annual International Symposium on Computer Architecture, Tel-Aviv, Israel, Jun. 23-27, 2013; pp. 237-248.

* cited by examiner

DATA PROCESSING METHOD, MEMORY MANAGEMENT UNIT, AND MEMORY CONTROL DEVICE

CROSS-REFERENCE TO RELATED APPLICATIONS

This application is a continuation of International Application No. PCT/CN2015/075205, filed on Mar. 27, 2015, the disclosure of which is hereby incorporated by reference in its entirety.

TECHNICAL FIELD

The present invention relates to the field of computer technologies, and in particular, to a memory management unit, a memory control device, and a method for data processing.

BACKGROUND

With development of computer architecture technologies, integration of a multi-core (Multi-Core) architecture or even a many-core (Many Core) architecture on a processor chip gradually becomes a mainstream. A chip of this architecture type is referred to as a multi-core processor chip, or referred to as a chip multi-processor (Chip Multi-Processors, CMPs) chip. An existing multi-core processor chip generally has a non-uniform cache architecture (Non-Uniformed Cache Architecture, NUCA). Specifically, each processor core (Core) privately owns a level 1 cache (Level 1 cache), and processor cores on a multi-core processor chip logically share a level 2 cache (Level 2 cache). However, because a cache capacity on a processor chip is limited, a part of data involved in a running process of a multi-core processor chip may also be stored in a memory device outside the multi-core processor chip. The multi-core processor chip communicates and the memory device performs communication by using a memory controller integrated on the multi-core processor chip.

A modern operating system provides an abstraction technology for memory management, namely, a virtual memory (Virtual Memory) technology. That is, programs run in virtual address space (Virtual Address Space), and any program uses an address in a virtual memory. The operating system assists a memory management unit (Memory Management Unit, MMU) in "conversion" of a virtual address sent by the program into a real physical address. A conversion relationship between a virtual address and a physical address is generally stored in a page table (Page Table). A page table occupies relatively large space and is therefore generally stored in a memory device outside a chip, and only some most frequently-used page tables are stored in a translation look-aside buffer (Translation Look-aside Buffer, TLB) on a processor chip.

Therefore, after obtaining a virtual address each time, a processor first queries, from a TLB, a physical address corresponding to the virtual address. If the physical address corresponding to the virtual address cannot be found in the TLB, the processor needs to query, from a memory device outside a chip, the physical address corresponding to the virtual address. Because a page table is generally designed with multiple levels, the processor needs to access the memory device multiple times to obtain the physical address needed by the processor. Consequently, each time of access to the memory device causes a burden to a communication channel on the processor chip.

SUMMARY

Embodiments of the present invention provide a method for processing data, a memory management unit, and a memory control device, to help resolve a problem that a process in which a processor accesses a memory device multiple times to obtain a physical address causes a burden to a communication channel on a processor chip.

A first aspect of the embodiments of the present invention provides a data processing method, including: receiving, by a memory management unit, a virtual address; determining, by the memory management unit, that the virtual address does not hit a translation look-aside buffer; reading, by the memory management unit, a page table base address register to obtain a page table base address; obtaining, by the memory management unit according to the page table base address, an identifier ID of a memory control device corresponding to the page table base address; sending, by the memory management unit, the virtual address, the page table base address, and the ID of the memory control device to the memory control device; receiving, by the memory management unit, a physical address that is sent by the memory control device and that is corresponding to the virtual address, where the physical address is obtained by the memory control device by executing a page table walk operation according to the virtual address and the page table base address; and updating, by the memory management unit, the translation look-aside buffer according to the physical address.

With reference to the first aspect, in a first implementation manner of the first aspect, before the sending, by the memory management unit, the virtual address, the page table base address, and the ID of the memory control device to the memory control device, the data processing method further includes: generating, by the memory management unit, a page table walk operation identifier, where the page table walk operation identifier indicates a page table walk operation; and the sending, by the memory management unit, the virtual address, the page table base address, and the ID of the memory control device to the memory control device includes: encapsulating, by the memory management unit, the virtual address, the page table base address, the ID of the memory control device, and the page table walk operation identifier together into a data packet; and sending, by the memory management unit, the data packet to the memory control device by using an on-chip router.

With reference to the first implementation manner of the first aspect, in a second implementation manner of the first aspect, before the sending, by the memory management unit, the virtual address, the page table base address, and the ID of the memory control device to the memory control device, the data processing method further includes: obtaining, by the memory management unit, an ID of a thread that sends the virtual address; and obtaining, by the memory management unit, an ID of a processor corresponding to the memory management unit, where the data packet further carries the ID of the thread that sends the virtual address and the ID of the processor corresponding to the memory management unit.

With reference to the first or the second implementation manner of the first aspect, in a third implementation manner of the first aspect, before the sending, by the memory management unit, the virtual address, the page table base address, and the ID of the memory control device to the memory control device, the data processing method further includes: obtaining, by the memory management unit, priority information of the thread that sends the virtual address, where the data packet further carries the priority information.

With reference to the first aspect or the first or second or third implementation manner of the first aspect, in a fourth implementation manner of the first aspect, the receiving, by the memory management unit, a physical address that is sent by the memory control device and that is corresponding to the virtual address includes: receiving, by the memory management unit, a data packet sent by the memory control device, where the data packet sent by the memory control device carries the virtual address and the physical address corresponding to the virtual address.

With reference to the fourth implementation manner of the first aspect, in a fifth implementation manner of the first aspect, the data packet sent by the memory control device further includes a page table walk operation complete identifier; and before the updating, by the memory management unit, the translation look-aside buffer according to the physical address, the data processing method further includes: confirming, by the memory management unit according to the page table walk operation complete identifier, that the data packet sent by the memory control device is used to update the translation look-aside buffer.

With reference to the fourth or the fifth implementation manner of the first aspect, in a sixth implementation manner of the first aspect, the data packet sent by the memory control device further includes an ID of a thread; and after the updating, by the memory management unit, the translation look-aside buffer according to the physical address, the method further includes: activating, according to the ID of the thread, the thread corresponding to the ID of the thread.

With reference to any one of the implementation manners of the first aspect, in a seventh implementation manner of the first aspect, the data packet sent by the memory management unit to the memory control device may further include the virtual address, an identifier of the virtual address, the page table base address, and the ID of the memory control device, where the identifier of the virtual address is used to indicate the virtual address, and the memory management unit stores a correspondence between the virtual address and the identifier of the virtual address; and the memory management unit further receives the identifier that is of the virtual address and that is sent by the memory control device, and obtains the virtual address according to the stored correspondence between the virtual address and the identifier of the virtual address.

A second aspect of the embodiments of the present invention provides a data processing method, including: receiving, by a memory control device, a virtual address and a page table base address that are sent by a memory management unit; executing, by the memory control device, a page table walk operation according to the virtual address and the page table base address, to obtain a physical address corresponding to the virtual address; and sending, by the memory control device to the memory management unit, the physical address corresponding to the virtual address.

With reference to the second aspect, in a first implementation manner of the second aspect, the receiving, by a memory control device, a virtual address and a page table base address that are sent by a memory management unit includes: receiving, by the memory control device, a data packet sent by the memory management unit by using an on-chip router, where the data packet includes the virtual address, the page table base address, an ID of a processor, and an ID of a thread, the ID of the processor is an ID of a processor corresponding to the memory management unit, and the ID of the thread is an ID of a thread that sends the virtual address; and the sending, by the memory control device to the memory management unit, the physical address corresponding to the virtual address includes: packing, by the memory control device, the physical address, the ID of the thread, and the ID of the processor into a packet, and sending the packet to the memory management unit.

With reference to the first implementation manner of the second aspect, in a second implementation manner, the data packet further includes a page table walk operation identifier; and before the executing, by the memory control device, a page table walk operation according to the virtual address and the page table base address, to obtain a physical address corresponding to the virtual address, the method further includes: determining, by the memory control device according to the page table walk operation identifier, that the data packet is used to execute a page table walk operation.

With reference to the second implementation manner of the second aspect, in a third implementation manner, the data packet further includes priority information; and before the executing, by the memory control device, a page table walk operation according to the virtual address and the page table base address, to obtain a physical address corresponding to the virtual address, the method further includes: after determining that the data packet is used to execute a page table walk operation, storing, by the memory control device into a page table walk operation cache, the priority information, and the virtual address and the page table base address that are corresponding to the priority information; and determining, by the memory control device according to the priority information stored in the page table walk operation cache, a virtual address and a page table base address for preferentially executing a page table walk operation.

With reference to any one of the implementation manners of the second aspect, corresponding to the seventh implementation manner of the first aspect, in a fourth implementation manner of the second aspect, if the data packet sent by the memory management unit to the memory control device includes the virtual address, an identifier of the virtual address, and the page table base address, the memory control device sends, to the memory management unit, the physical address corresponding to the virtual address and the identifier of the virtual address.

A third aspect of the embodiments of the present invention provides a memory management unit, including a receiving module, configured to receive a virtual address; a processing module, configured to determine that the virtual address does not hit a translation look-aside buffer, read a page table base address register to obtain a page table base address, and obtain, according to the page table base address, an identifier ID of a memory control device corresponding to the page table base address; and a sending module, configured to send the virtual address, the page table base address, and the ID of the memory control device to the memory control device, where the processing module is further configured to receive a physical address that is sent by the memory control device and that is corresponding to the virtual address, where the physical address is obtained by the memory control device by executing a page table walk operation according to the virtual address and the page table base address; and update the translation look-aside buffer according to the physical address.

With reference to the third aspect, in a first implementation manner of the third aspect, the processing module is further configured to generate a page table walk operation identifier, where the page table walk operation identifier indicates a page table walk operation; and the sending module is specifically configured to encapsulate the virtual address, the page table base address, the ID of the memory control device, and the page table walk operation identifier together into a data packet, and send the data packet to the memory control device by using an on-chip router.

With reference to the first implementation manner of the third aspect, in a second implementation manner, the receiving module is further configured to obtain an ID of a thread that sends the virtual address and an ID of a processor corresponding to the memory management unit, where the data packet further carries the ID of the thread that sends the virtual address and the ID of the processor corresponding to the memory management unit.

With reference to the first or the second implementation manner of the third aspect, in a third implementation manner, the receiving module is further configured to obtain priority information of the thread that sends the virtual address, where the data packet further carries the priority information.

With reference to the third aspect or the first or second or third implementation manner of the third aspect, in a fourth implementation manner, that the processing module receives a physical address that is sent by the memory control device and that is corresponding to the virtual address includes: receiving, by the processing module, a data packet sent by the memory control device, where the data packet sent by the memory control device carries the virtual address and the physical address corresponding to the virtual address.

With reference to the fourth implementation manner of the third aspect, in a fifth implementation manner, the data packet sent by the memory control device further includes a page table walk operation complete identifier; and before updating the translation look-aside buffer according to the physical address, the processing module further confirms, according to the page table walk operation complete identifier, that the data packet sent by the memory control device is used to update the translation look-aside buffer.

With reference to the third or the fourth implementation manner of the third aspect, in a sixth implementation manner, the data packet sent by the memory control device further includes an ID of a thread; and the processing module is further configured to: after updating the translation look-aside buffer according to the physical address, activate, according to the ID of the thread, the thread corresponding to the ID of the thread.

With reference to the third aspect or any one of the implementation manners of the third aspect, in a seventh implementation manner, the data packet sent by the sending module to the memory control device may further include the virtual address, an identifier of the virtual address, the page table base address, and the ID of the memory control device, where the identifier of the virtual address is used to indicate the virtual address, and the processing module stores a correspondence between the virtual address and the identifier of the virtual address; the receiving module further receives the identifier that is of the virtual address and that is sent by the memory control device; and the processing module is further configured to obtain the virtual address according to the stored correspondence between the virtual address and the identifier of the virtual address.

A fourth aspect of the embodiments of the present invention provides a memory control device, including: a receiving module, configured to receive a virtual address and a page table base address that are sent by a memory management unit; a processing module, configured to execute a page table walk operation according to the virtual address and the page table base address, to obtain a physical address corresponding to the virtual address; and a sending module, configured to send, to the memory management unit, the physical address corresponding to the virtual address.

With reference to the fourth aspect, in a first implementation manner of the fourth aspect, the receiving module is specifically configured to receive a data packet sent by the memory management unit by using an on-chip router, where the data packet includes the virtual address, the page table base address, an ID of a processor, and an ID of a thread, the ID of the processor is an ID of a processor corresponding to the memory management unit, and the ID of the thread is an ID of a thread that sends the virtual address; and the sending module is specifically configured to pack the physical address, the ID of the thread, and the ID of the processor into a packet, and send the packet to the memory management unit.

With reference to the first implementation manner of the fourth aspect, in a second implementation manner, the data packet further includes a page table walk operation identifier; and the receiving module is further configured to receive the data packet, and determine, according to the page table walk operation identifier, that the data packet is used to execute a page table walk operation.

With reference to the second implementation manner of the fourth aspect, in a third implementation manner, the data packet further includes priority information; the receiving module is further configured to: after determining that the data packet is used to execute a page table walk operation, store, into a page table walk operation cache, the priority information, and the virtual address and the page table base address that are corresponding to the priority information; and the processing module is further configured to determine, according to the priority information stored in the page table walk operation cache, a virtual address and a page table base address for preferentially executing a page table walk operation.

With reference to any one of the implementation manners of the fourth aspect, corresponding to the seventh implementation manner of the third aspect, in a fourth implementation manner of the fourth aspect, if the data packet sent by the memory management unit to the memory control device includes the virtual address, an identifier of the virtual address, and the page table base address, the sending module sends, to the memory management unit, the physical address corresponding to the virtual address and the identifier of the virtual address.

A fifth aspect of the embodiments of the present invention provides a processor chip, including the memory management unit according to the third aspect or any one of the implementation manners of the third aspect, and further including the memory control device according to the fourth aspect or any one of the implementation manners of the fourth aspect, and at least one on-chip router, where the at least one on-chip router is configured to establish a communication connection between the memory control device and the memory management unit.

According to the embodiments provided above, when a TLB miss occurs, a memory management unit packs various types of information required for executing a page table walk operation into a data packet and sends the data packet to an on-chip router, so that the page table walk operation is executed by only a memory control device on a processor chip instead of being executed by memory management units corresponding to processor cores, thereby reducing a burden caused to an on-chip communications network because the memory management units all need to send a data packet multiple times when a multiple-level page table needs to be queried.

BRIEF DESCRIPTION OF THE DRAWINGS

To describe the technical solutions in the embodiments of the present invention or in the prior art more clearly, the following briefly describes the accompanying drawings required for the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
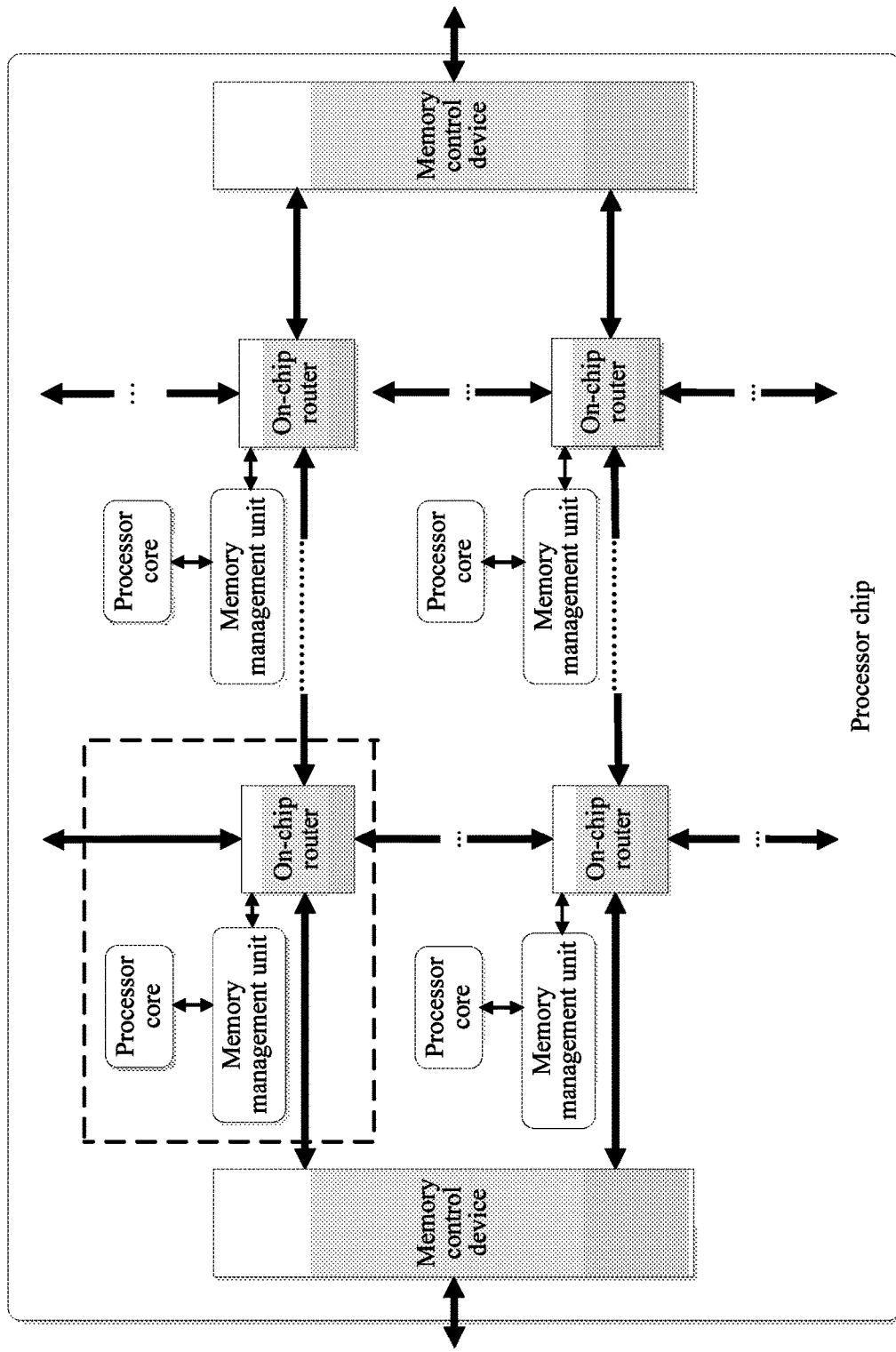
FIG. 1 is a schematic architecture diagram of a processor chip applied in an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention.

Throughout this specification, the term "processor core" generally refers to one or more processing units that are of a processor chip and execute data processing tasks, or may be referred to as a processor core or a processing core, or may be an integrated circuit chip with a signal processing capability, for example, a general purpose processor, a digital signal processor (Digital Signal Processor, DSP), an application-specific integrated circuit (Application Specific Integrated Circuit, ASIC), a field programmable gate array (Field Programmable Gate Array, FPGA).

Throughout this specification, the term "memory management unit" (MMU) is configured to manage control lines of a virtual memory and a physical memory, is also responsible for mapping a virtual address to a physical address and providing memory access authorization of a hardware mechanism, and is generally located in a central processing unit. Each memory management unit on a multi-core processing chip is also in a correspondence with a processor in which the memory management unit is located.

Throughout this specification, the term "memory control device" refers to a device that not only has a function that is owned by a conventional memory controller and that is for assisting a CPU in accessing a memory device, but also has a function related to execution of a page table walk operation in this specification. Generally, a conventional memory controller or a unit that has a function of a conventional memory controller also needs to be integrated in the memory control device.

Throughout this specification, the term "translation look-aside buffer" (TLB) is also referred to as a transmission look-aside buffer or a page table buffer, is generally located in a memory management unit, and is configured to store some most frequently-used page tables to speed up query of a page table. In addition, a translation look-aside buffer hit (TLB hit) in this specification means that when receiving a virtual address, a memory management unit first queries a TLB according to the virtual address. If it is found that a corresponding physical address is stored in the TLB, a TLB hit occurs. Correspondingly, if no corresponding physical address is found in the TLB, a TLB miss occurs, and in this case, a page table walk operation needs to be executed to obtain a physical address corresponding to the virtual address, to update the TLB.

Throughout this specification, the term "page table walk operation" is an operation of obtaining a physical address according to a virtual address and a page table base address. Generally, a page table is divided into multiple levels For example, if a page table is divided into four levels, when a page table walk operation is executed once, a level-1 page table is first queried according to a page table base address and a first part of a virtual address. After data stored in a corresponding address in the level-1 page table is obtained, it is determined whether the data is a required physical address. If the data is not the required physical address, a level-2 page table is queried according to the data and a second part of the virtual address, and then data stored in a corresponding address in the level-2 page table is obtained. The foregoing process is repeated until data stored in a corresponding address in a level-4 page table is obtained. The address is a physical address corresponding to the virtual address, and the page table walk operation is completed.

An Architecture of a Processor Chip in the Embodiments of the Present Invention

FIG. 1 describes a schematic diagram of a part of an architecture of a processor chip according to an embodiment of the present invention. Persons skilled in the art may understand that, FIG. 1 is the part of the architecture of the processor chip, and an actual architecture of the processor chip may be formed by means of extension of multiple parts shown in FIG. 1 (a part replaced with a dotted line in FIG. 1 is one or more parts shown in the dashed-line box). A processor chip generally includes multiple processor cores, and is also referred to as a multi-core processor chip. Each processor core is corresponding to a memory management unit, and a TLB is disposed in the memory management unit. Each processor core may communicate with another processor core by using an on-chip router, or may communicate with a memory control device on a processor chip. Any processor core can communicate with a memory device outside the processor chip by using the memory control device.

Method Embodiment 1

Figure 2:
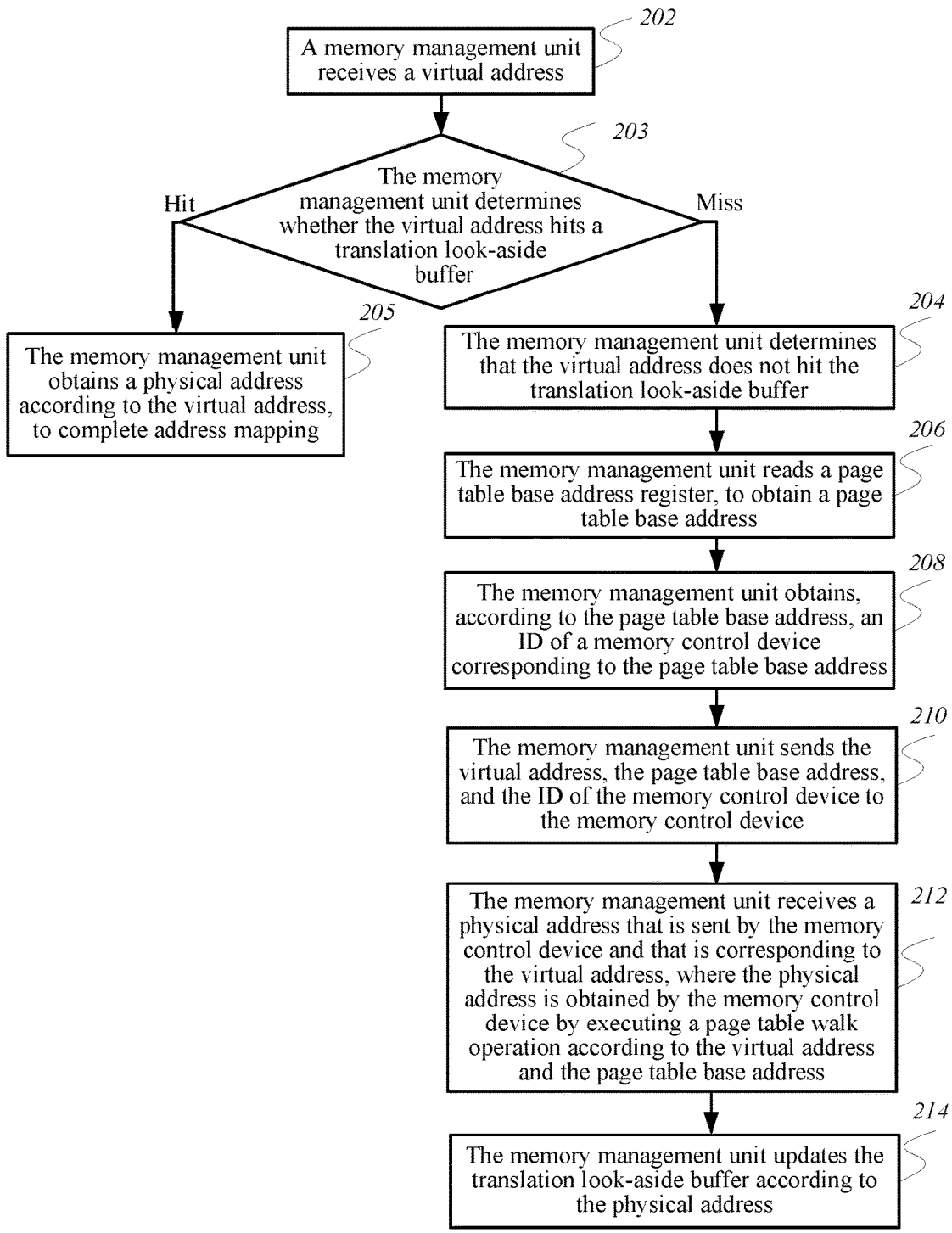
FIG. 2 is a schematic flowchart of a data processing method applied in method embodiment 1 of the present invention.

This method embodiment 1 provides a data processing method, and a schematic flowchart of the data processing method is shown in FIG. 2. The method may be used by a memory management unit, or another device in which a function of a memory management unit is integrated.

Step 202: A memory management unit receives a virtual address.

A 48-bit virtual address used in an ARMv8 architecture is used as an example, and the virtual address generally uses a 4-level page table. The entire virtual address is divided into five fields, a VA[11:0] is an offset address in a page table, a VA[20:12] is an offset address in which a level-3 page table is located, a VA[29:21] is an offset address in which a level-2 page table is located, a VA[38:30] is an offset address in which a level-1 page table is located, and a VA[47:39] is an offset address in which a level-0 page table is located.

Step 203: The memory management unit determines whether the virtual address hits a translation look-aside buffer.

Step 204: The memory management unit determines that the virtual address does not hit the translation look-aside buffer.

Based on the foregoing example, after receiving the virtual address, the memory management unit first queries a content addressable memory (CAM) in the TLB by using a VA[47:12]. A CAM shown in Table 1 is used as an example. If the memory management unit finds no matching item of the VA[47:12] in the CAM, it indicates that the translation look-aside buffer is not hit, and a TLB miss occurs.

Step 205: The memory management unit determines that the virtual address hits the translation look-aside buffer, and obtains a physical address according to the virtual address, to complete address mapping.

Based on the foregoing example, if the memory management unit finds a matching item of the VA[47:12] in the CAM, it indicates that a TLB hit occurs. In this case, the memory management unit obtains, by using the CAM, a random access memory (RAM) address corresponding to the VA[47:12], and accesses a RAM according to the RAM address, to obtain a physical address, for example, a PA[47:12], stored in the corresponding RAM address. In this case, a 48-bit address formed by the PA[47:12] and the VA[11:0] is a physical address corresponding to the 48-bit virtual address received in step 202, and address mapping is completed.

TABLE 1

| VA column | RAM address column |
|---|---|
| First VA address | First RAM address |
| Second VA address | Second RAM address |
| ... | ... |

Step 206: The memory management unit reads a page table base address register to obtain a page table base address.

For example, in step 203, if the translation look-aside buffer is not hit, after step 204, the memory management unit accesses the page table base address register. Based on the foregoing example, a page table base address register in the ARMv8 architecture is a TTBR0/TTBR1, and a page table base address, for example, a TTBR[47:12], stored in the page table base address register is read.

Step 208: The memory management unit obtains, according to the page table base address, an ID of a memory control device corresponding to the page table base address.

Based on the foregoing example, after obtaining the TTBR[47:12], the memory management unit obtains, according to a preset correspondence between the TTBR [47:12] and the ID of the memory control device, the ID of the memory control device corresponding to the page table base address. In practice, page tables corresponding to different page table base addresses are stored in different memory devices, and different memory devices are also managed by different memory control devices. Therefore, the page table base address is also in a correspondence with the ID of the memory control device.

Optionally, before step 210, the memory management unit may further generate a page table walk operation identifier. The page table walk operation identifier indicates a page table walk operation. In practice, a form of the page table walk operation identifier is not limited. The memory control device can identify, according to the page table walk operation identifier, content carried in a data packet that carries the page table walk operation identifier is used for a page table walk operation. Correspondingly, if a data packet sent by a processor core is a data packet for executing a normal data read/write operation, the data packet may carry another operation identifier that is used by the memory control device to identify and process different types of data packets in different manners after the memory control device receives the different types of data packets.

Optionally, before step 210, the memory management unit may further obtain an ID of a thread that sends the virtual address and an ID of a processor corresponding to the memory management unit. When a thread needs to read or write data, if the memory management unit accesses a TLB and a TLB miss occurs, the thread can continue to be executed only after a page table walk operation is completed. Therefore, the thread generally needs to be suspended, for example, stored in a thread selection module of a processor core. When a data packet that carries a physical address corresponding to the virtual address needs to be returned to the memory management unit, first, an on-chip router needs the ID of the processor corresponding to the memory management unit to route the data packet to the memory management unit; then, after the memory management unit receives the data packet that carries the physical address and completes updating of the translation look-aside buffer, because multiple threads may be suspended in the thread selection module, the memory management unit also needs an ID number of a thread corresponding to the physical address to activate a corresponding thread in the thread selection module. Because the page table walk operation and updating of the translation look-aside buffer have been completed, the virtual address sent by the thread definitely hits the translation look-aside buffer, so that the thread can continue to run.

Optionally, before step 210, the memory management unit may further obtain priority information of the thread that sends the virtual address. Specifically, the priority information may indicate that the thread that sends the virtual address needs to be preferentially processed, and is used to distinguish different processing priorities of data packets corresponding to virtual addresses sent by different threads, and may also indicate different processing priorities of a data packet used for a page table walk operation and a data packet for a normal read/write operation.

Step 210: The memory management unit sends the virtual address, the page table base address, and the ID of the memory control device to the memory control device.

For example, after obtaining the virtual address, the page table base address, and the ID of the memory control device in step 202 to step 208, the memory management unit encapsulates the virtual address, the page table base address, and the ID of the memory control device into a data packet that conforms to an on-chip communication protocol of a processor chip, and sends the data packet to an on-chip router, so that the on-chip router can route the data packet to the corresponding memory control device according to the ID of the memory control device carried in the data packet.

For another example, after the memory management unit obtains the virtual address, the page table base address, and the ID of the memory control device in step 202 to step 208, the memory management unit may be not responsible for encapsulating a data packet. Instead, the memory management unit sends the foregoing data to a processor core or a dedicated data packet encapsulation module. The processor core or the dedicated data packet encapsulation module encapsulates the data into a data packet, and sends the data packet to an on-chip router. The on-chip router routes the data packet to the corresponding memory control device according to the ID of the memory control device encapsulated into the data packet.

Optionally, if before step 210, the memory management unit further generates the page table walk operation identifier, the data packet in step 210 may further include the page table walk operation identifier.

Optionally, if before step 210, the memory management unit further obtains the ID of the thread that sends the virtual address and the ID of the processor corresponding to the memory management unit, the data packet in step 210 may further include the ID of the thread that sends the virtual address and the ID of the processor corresponding to the memory management unit.

Optionally, if before step 210, the memory management unit further obtains the priority information of the thread that sends the virtual address, the data packet in step 210 may further include the priority information of the thread that sends the virtual address.

Table 2 shows a possible frame structure of the data packet in step 210. The page table walk operation identifier, the ID of the processor, and the ID and the priority information of the thread are all optional content.

It should be noted that, in an optional solution, the data packet sent by the memory management unit to the memory control device may further include the virtual address, an identifier of the virtual address, the page table base address, and the ID of the memory control device. The identifier of the virtual address is used to indicate the virtual address. The memory management unit stores a correspondence between the virtual address and the identifier of the virtual address. That is, the memory management unit first stores the correspondence between the virtual address and the identifier of the virtual address, and then encapsulates the identifier of the virtual address into a data packet and sends the data packet to the memory control device, so that when the memory control device completes a page table walk operation and returns the data packet, the data packet does not need to carry the virtual address, but needs to carry only the identifier of the virtual address.

TABLE 2

| Page table walk operation identifier | ID of processor | ID and priority information of thread | ID of memory control device | Page table base address and virtual address |
|---|---|---|---|---|

Step 212: The memory management unit receives a physical address that is sent by the memory control device and that is corresponding to the virtual address, where the physical address is obtained by the memory control device by executing a page table walk operation according to the virtual address and the page table base address.

For example, after the memory management unit sends the data packet in step 210, the memory control device executes the page table walk operation according to content of the data packet, to obtain the physical address corresponding to the virtual address. The memory management unit further receives the physical address that is sent by the memory control device and that is corresponding to the virtual address.

Optionally, in step 212, the memory management unit receives a data packet sent by the memory control device. The data packet sent by the memory control device carries the virtual address and the physical address corresponding to the virtual address.

Optionally, if the data packet sent by the memory management unit to the memory control device in step 210 may further include the virtual address, an identifier of the virtual address, the page table base address, and the ID of the memory control device, the data packet sent by the memory control device in step 212 carries the identifier of the virtual address and the physical address corresponding to the virtual address.

Step 214: The memory management unit updates the translation look-aside buffer according to the physical address.

For example, after receiving the physical address, the memory management unit needs to update a CAM and a RAM in the translation look-aside buffer, so that when querying the CAM again according to the VA[47:12], the memory management unit can find a RAM address, and query a corresponding RAM by using the RAM address, to obtain the physical address, that is, hit the translation look-aside buffer.

Optionally, if in step 212, the memory management unit receives a data packet sent by the memory control device, and the data packet further includes a page table walk operation complete identifier. Before updating the translation look-aside buffer according to the data packet, the memory management unit needs to confirm, according to the page table walk operation complete identifier, that the data packet is used to update the translation look-aside buffer. Specifically, because various types of data packets may be simultaneously transmitted on a processor chip, when receiving a data packet, a processor core or the memory management unit needs to distinguish a type of the data packet. Therefore, the data packet further includes a page table walk operation complete identifier used to identify the type of the data packet. The page table walk operation complete identifier is corresponding to the foregoing page table walk operation identifier, the latter is used to indicate that a data packet includes content used for a page table walk operation, and the former is used to indicate that a data packet includes content obtained after a page table walk operation is completed.

Optionally, if the data packet received by the memory management unit in step 212 further includes an ID of a thread, and the ID of the thread is the ID of the thread that sends the virtual address, after updating the translation look-aside buffer, the memory management unit activates, according to the ID of the thread, the thread corresponding to the ID of the thread. Specifically, if the data packet sent by the memory management unit carries the ID of the thread that sends the virtual address, after the memory control device obtains the physical address corresponding to the data packet, the data packet sent by the memory control device to the memory management unit further carries the ID of the thread, so that after receiving the data packet sent by the memory control device and updating the translation look-aside buffer, the memory management unit can activate the corresponding thread according to the ID of the thread.

Table 3 shows a possible frame structure of the data packet sent by the memory control device. The page table walk operation complete identifier, the ID of the processor, the ID of the thread, and the virtual address are all optional content.

TABLE 3

| Page table walk operation complete identifier | ID of processor | ID of thread | Physical address and virtual address |
| --- | --- | --- | --- |

In this method embodiment, if a memory management unit receives a virtual address and a TLB miss occurs, the memory management unit packs various types of information required for executing a page table walk operation into a data packet and sends the data packet to an on-chip router, so that the page table walk operation is executed by only a memory control device on a processor chip instead of being executed by memory management units corresponding to processor cores, thereby reducing a burden caused to an on-chip communication channel because the memory management units of the multiple processor cores all need to send a data packet multiple times when a multiple-level page table needs to be queried. Moreover, because a quantity of times of communication between the memory management unit and the memory control device is reduced, and instead, the memory control device completes multiple times of access to a memory device outside the chip, completion of the page table walk operation is also speeded up, thereby helping improve overall efficiency of the page table walk operation.

Method Embodiment 2

Figure 3:
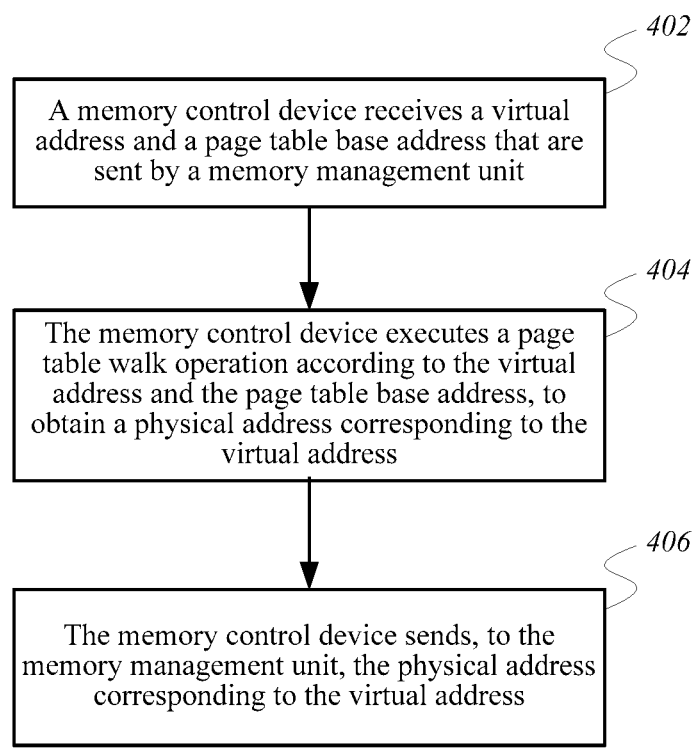
FIG. 3 is a schematic flowchart of a data processing method applied in method embodiment 2 of the present invention.

This method embodiment 2 provides a data processing method, and a schematic flowchart of the data processing method is shown in FIG. 3. The method may be used by a memory control device, or another device in which a function of a memory control device is integrated.

Step 402: A memory control device receives a virtual address and a page table base address that are sent by a memory management unit.

Specifically, the memory control device receives a data packet sent by the memory management unit. The data packet carries the virtual address and the page table base address. The data packet may be the data packet mentioned in step 210 in method embodiment 1 and optional solutions of step 210.

Optionally, the data packet further includes an ID of a processor and an ID of a thread. The ID of the processor is an ID of a processor corresponding to the memory management unit in step 402, and the ID of the thread is an ID of a thread that sends the virtual address.

Optionally, the data packet further includes a page table walk operation identifier. In this case, before the memory control device performs step 404, the memory control device determines, according to the page table walk operation identifier, that the data packet is used to execute a page table walk operation.

Optionally, the data packet further includes priority information. In this case, before step 404 is performed, it is first confirmed, according to the page table walk operation identifier, that the data packet is used to execute a page table walk operation, and the data packet is then stored into a page table walk operation cache, for example, Table 4. Correspondingly, the memory control device may further receive another data packet, for example, a normal data read/write data packet, and these data packets also include an identifier indicating normal data read/write. After receiving these data packets, the memory control device may unpack these data packets and store, into a data read/write cache, content obtained after unpacking.

TABLE 4

| Priority information 1 | Virtual address 1 | Page table base address |
| --- | --- | --- |
| Priority information 2 | Virtual address 2 | Page table base address |
| . . . | . . . | . . . |
| Priority information n | Virtual address n | Page table base address |

Step 404: The memory control device executes a page table walk operation according to the virtual address and the page table base address, to obtain a physical address corresponding to the virtual address.

Specifically, based on method embodiment 1, the entire virtual address is divided into five fields, a VA[11:0] is an offset address in a page table, a VA[20:12] is an offset address in which a level-3 page table is located, a VA[29:21] is an offset address in which a level-2 page table is located, a VA[38:30] is an offset address in which a level-1 page table is located, a VA[47:39] is an offset address in which a level-o page table is located, and a page table base address is a TTBR[47:12].

First, the memory control device forms a physical address 1={TTBR[47:12], VA[47:39], 000}, queries, according to the physical address 1, a memory device that stores a page table, reads content in a page table corresponding to the physical address 1, and determines whether the content is a bottom-level page table. For example, if the lowest two bits of the content in the page table corresponding to the physical address 1 are or, it indicates that the page table is the bottom-level page table, and the page table corresponding to the physical address 1 includes a physical address required for the page table walk operation. If the lowest two bits of the content in the page table corresponding to the physical address 1 are 10, it indicates that the page table is not the bottom-level page table, and content, for example, L0_Dspt[47:12], in the page table is read.

Second, a physical address 2={L0_Dspt[47:12], VA[38:30], 000} is formed, and the foregoing process is repeated again until a bottom-level page table is found, and a physical address included in the bottom-level page table is obtained. A 4-level page table is used as an example. A physical address obtained in a level-4 page table is L4_Dspt[47:12], and L4_Dspt[47:12] and the VA[11:0] form a new 48-bit address. The address is the physical address corresponding to the virtual address in step 402. Therefore, the page table walk operation is completed. It should be noted that, in practice, there are multiple implementation manners of regarding a quantity of levels of a page table and identifying whether content in a page table points to a next-level page table or a bottom-level page table, and merely examples are described herein.

Optionally, the data packet received in step 402 includes priority information. If before step 404, the data packet has been cached in a page table walk operation cache, before performing step 404, the memory control device first selects, according to each piece of priority information in the page table walk operation cache, for example, Table 4, a virtual address and a page table base address that are to be preferentially processed. If the memory control device further receives a normal data read/write data packet, and stores the data packet into a data read/write cache, the memory control device may further select, by comprehensively considering priorities of tasks stored in the data read/write cache and the page table walk operation cache, a task to be preferentially processed.

Optionally, before step 406, the memory control device further generates a page table walk operation complete identifier. The page table walk operation complete identifier is the page table walk operation identifier carried in the data packet received by the memory management unit in step 212 in method embodiment 1.

Step 406: The memory control device sends, to the memory management unit, the physical address corresponding to the virtual address.

Optionally, if the data packet in step 402 further includes an ID of a processor and an ID of a thread, after obtaining the physical address in step 404, the memory control device may further pack the physical address, the ID of the thread, and the ID of the processor into a packet, and send the packet to the memory management unit. The data packet sent by the memory control device is corresponding to the data packet shown in Table 3 in method embodiment 1.

Optionally, before step 406, if the memory control device further generates a page table walk operation complete identifier, the memory control device may further send the page table walk operation complete identifier to the memory management unit, so that before updating the translation look-aside buffer according to the data packet, the memory management unit needs to confirm, according to the page table walk operation complete identifier, that the data packet is used to update the translation look-aside buffer.

In this method embodiment, after receiving content required for executing a page table walk operation, a memory control device executes the page table walk operation, so that multiple times of access to a page table in a process of the page table walk operation only need to be completed between the memory control device and a memory device outside a chip. Multiple interactions do not need to be performed between a memory management unit and the memory control device, thereby lightening a communication burden on the chip. Moreover, efficiency is also increased due to direct interaction between the memory control device and the memory device, and completion of the page table walk operation is speeded up, thereby helping improve overall efficiency of the page table walk operation.

Device Embodiment 1

Figure 4:
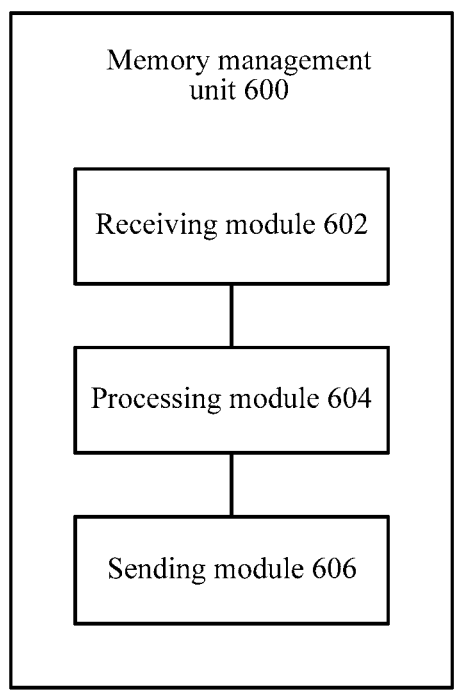
FIG. 4 is a schematic structural diagram of a memory management unit applied in device embodiment 1 of the present invention.

Apparatus embodiment 1 of the present invention provides a memory management unit 600. A schematic structural diagram of the memory management unit 600 is shown in FIG. 4. The memory management unit 600 includes: a receiving module 602, a processing module 604, and a sending module 606.

The receiving module 602 is configured to receive a virtual address.

Specifically, the receiving module 602 performs step 202 in method embodiment 1 in an actual running process.

Optionally, the receiving module 602 is further configured to obtain an ID of a thread that sends the virtual address and an ID of a processor corresponding to the memory management unit. For details, refer to an optional action of the memory management unit before step 210 in method embodiment 1.

Optionally, the receiving module 602 is further configured to obtain priority information of the thread that sends the virtual address. For details, refer to an optional action of the memory management unit before step 210 in method embodiment 1.

The processing module 604 is configured to: determine that the virtual address does not hit a translation look-aside buffer, read a page table base address register to obtain a page table base address, and obtain, according to the page table base address, an ID of a memory control device corresponding to the page table base address.

Specifically, the processing module 604 performs step 204 to step 208 and optional solutions of step 204 to step 208 in method embodiment 1 in an actual running process.

Optionally, the processing module 604 is further configured to generate a page table walk operation identifier. The page table walk operation identifier indicates a page table walk operation. For details, refer to an optional action of the memory management unit before step 210 in method embodiment 1.

The sending module 606 is configured to send the virtual address, the page table base address, and the ID of the memory control device to the memory control device.

Specifically, the sending module 606 performs step 210 and an optional solution of step 210 in method embodiment 1 in an actual running process.

Optionally, if the processing module 604 generates the page table walk operation identifier, the sending module 606 is further configured to send the page table walk operation identifier to the memory control device. For details, refer to an optional action of step 210 in method embodiment 1.

Optionally, if the receiving module 602 obtains the ID of the thread that sends the virtual address and the ID of the processor corresponding to the memory management unit, the sending module 606 is further configured to send, to the memory control device, the ID of the thread that sends the virtual address and the ID of the processor corresponding to the memory management unit together. For details, refer to an optional action of step 210 in method embodiment 1.

Optionally, if the receiving module 602 obtains the priority information of the thread that sends the virtual address, the sending module 606 is further configured to send, to the memory control device, the priority information of the thread that sends the virtual address. For details, refer to an optional action of step 210 in method embodiment 1.

The processing module 604 is further configured to: receive a physical address that is sent by the memory control device and that is corresponding to the virtual address, where the physical address is obtained by the memory control device by executing a page table walk operation according to the virtual address and the page table base address; and update the translation look-aside buffer according to the physical address.

Specifically, the processing module 604 further performs step 212 and step 214 in method embodiment 1 in an actual running process.

Optionally, that the processing module 604 receives a physical address that is sent by the memory control device and that is corresponding to the virtual address includes: receiving, by the processing module 604, a data packet sent by the memory control device, where the data packet sent by the memory control device carries the virtual address and the physical address corresponding to the virtual address. Alternatively, the receiving module 602 receives a data packet sent by the memory control device, and the receiving module 602 sends, to the processing module 604, the virtual address and the physical address corresponding to the virtual address that are carried in the data packet.

Optionally, the data packet sent by the memory control device further includes a page table walk operation complete identifier, and before updating the translation look-aside buffer according to the physical address, the processing module 604 further confirms, according to the page table walk operation complete identifier, that the data packet sent by the memory control device is used to update the translation look-aside buffer. Alternatively, the data packet received by the receiving module 602 further includes a page table walk operation complete identifier; the receiving module 602 sends, to the processing module 604, the page table walk operation identifier together with the virtual address and the physical address corresponding to the virtual address that are carried in the data packet; and the processing module 604 confirms, according to the page table walk operation complete identifier, that the data packet is used to update the translation look-aside buffer, and updates the translation look-aside buffer according to the physical address.

Optionally, the data packet sent by the memory control device further includes an ID of a thread, and the processing module 604 is further configured to: after updating the translation look-aside buffer according to the physical address, activate, according to the ID of the thread, the thread corresponding to the ID of the thread. Alternatively, the data packet received by the receiving module 602 further includes an ID of a thread, and the receiving module 602 sends, to the processing module 604, the ID of the thread together with the virtual address and the physical address corresponding to the virtual address that are carried in the data packet; and after updating the translation look-aside buffer according to the physical address, the processing module 604 activates, according to the ID of the thread, the thread corresponding to the ID of the thread.

This device embodiment provides a memory management unit. If the memory management unit receives a virtual address and a TLB miss occurs, the memory management unit packs various types of information required for executing a page table walk operation into a data packet and sends the data packet to an on-chip router, so that the page table walk operation is executed by only a memory control device on a processor chip instead of being executed by memory management units corresponding to processor cores, thereby reducing a burden caused to an on-chip communication channel because the memory management units of the multiple processor cores all need to send a data packet multiple times when a multiple-level page table needs to be queried. Moreover, because a quantity of times of communication between the memory management unit and the memory control device is reduced, and instead, the memory control device completes multiple times of access to a memory device outside the chip, completion of the page table walk operation is also speeded up, thereby helping improve overall efficiency of the page table walk operation.

Device Embodiment 2

Figure 5:
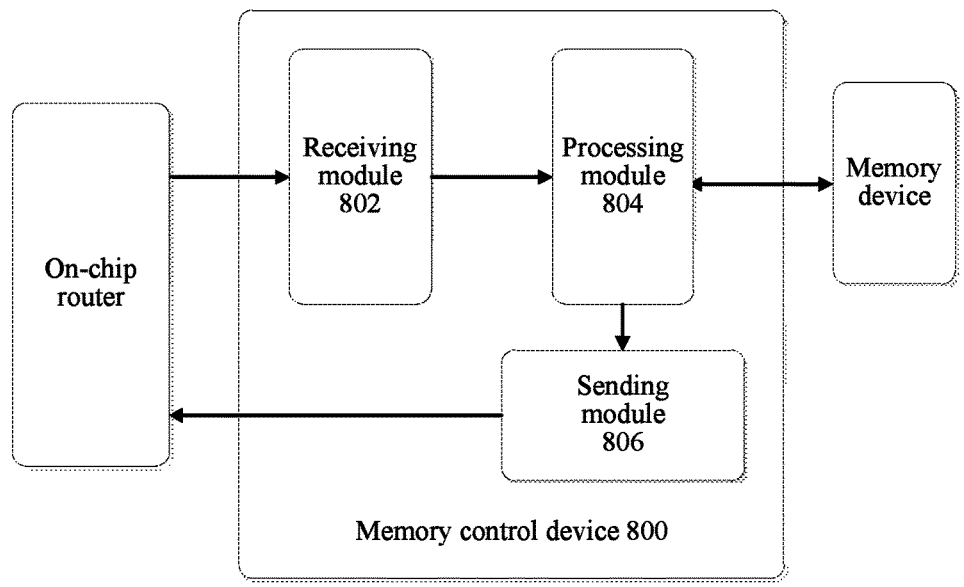
FIG. 5 is a schematic structural diagram of a memory control device applied in device embodiment 2 of the present invention.

Device embodiment 2 of the present invention provides a memory control device 800. A schematic structural diagram of the memory control device 800 is shown in FIG. 5. The memory control device includes: a receiving module 802, a processing module 804, and a sending module 806.

The receiving module 802 is configured to receive a virtual address and a page table base address that are sent by a memory management unit.

Specifically, as shown in FIG. 5, after obtaining a data packet from an on-chip router, the receiving module 802 parses the data packet to obtain the virtual address and the page table base address that are carried in the data packet, and sends the virtual address and the page table base address to the processing module 804.

Optionally, the data packet further includes an ID of a processor and an ID of a thread. The ID of the processor is an ID of a processor corresponding to the memory management unit that sends the virtual address and the page table base address, and the ID of the thread is an ID of a thread that sends the virtual address.

Optionally, the data packet further includes a page table walk operation identifier. The receiving module 802 is further configured to: parse the data packet to obtain the page table walk operation identifier, the virtual address, and the page table base address, determine, according to the page table walk operation identifier, that the data packet is used to execute a page table walk operation, and then send the virtual address and the page table base address to the processing module 804. If the data packet received by the receiving module 802 is a data packet for executing a normal data read/write operation, the data packet may carry another operation identifier that is used by the memory control device to identify and process different types of data packets in different manners after the memory control device receives the different types of data packets.

The processing module 804 is configured to execute a page table walk operation according to the virtual address and the page table base address, to obtain a physical address corresponding to the virtual address.

Specifically, the processing module 804 accesses a memory device according to the virtual address and the page table base address, and executes the page table walk operation according to the virtual address and the page table base address. For specific operation details, refer to content of step 404 in method embodiment 2.

Optionally, the processing module 804 is further configured to generate a page table walk operation complete identifier, and the memory management unit confirms, according to the page table walk operation complete identifier, that the data packet that carries the page table walk operation complete identifier is used to update the translation look-aside buffer.

The sending module 806 is configured to send, to the memory management unit, the physical address corresponding to the virtual address.

Optionally, if the data packet received by the receiving module 802 includes the ID of the processor and the ID of the thread, the sending module 806 is further configured to pack the physical address, the ID of the thread, and the ID of the processor into a packet, and send the packet to the memory management unit.

Optionally, if the processing module 804 further generates the page table walk operation complete identifier, the sending module 806 is further configured to encapsulate the page table walk operation complete identifier into the data packet and send the data packet to the memory management unit.

Figure 6:
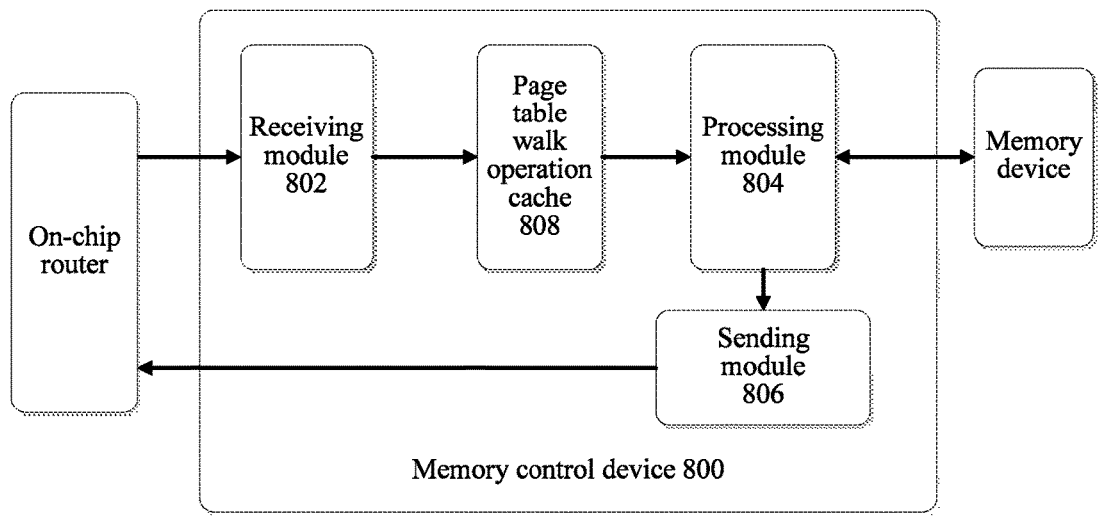
FIG. 6 is a schematic structural diagram of another memory control device applied in device embodiment 2 of the present invention.
Figure 7:
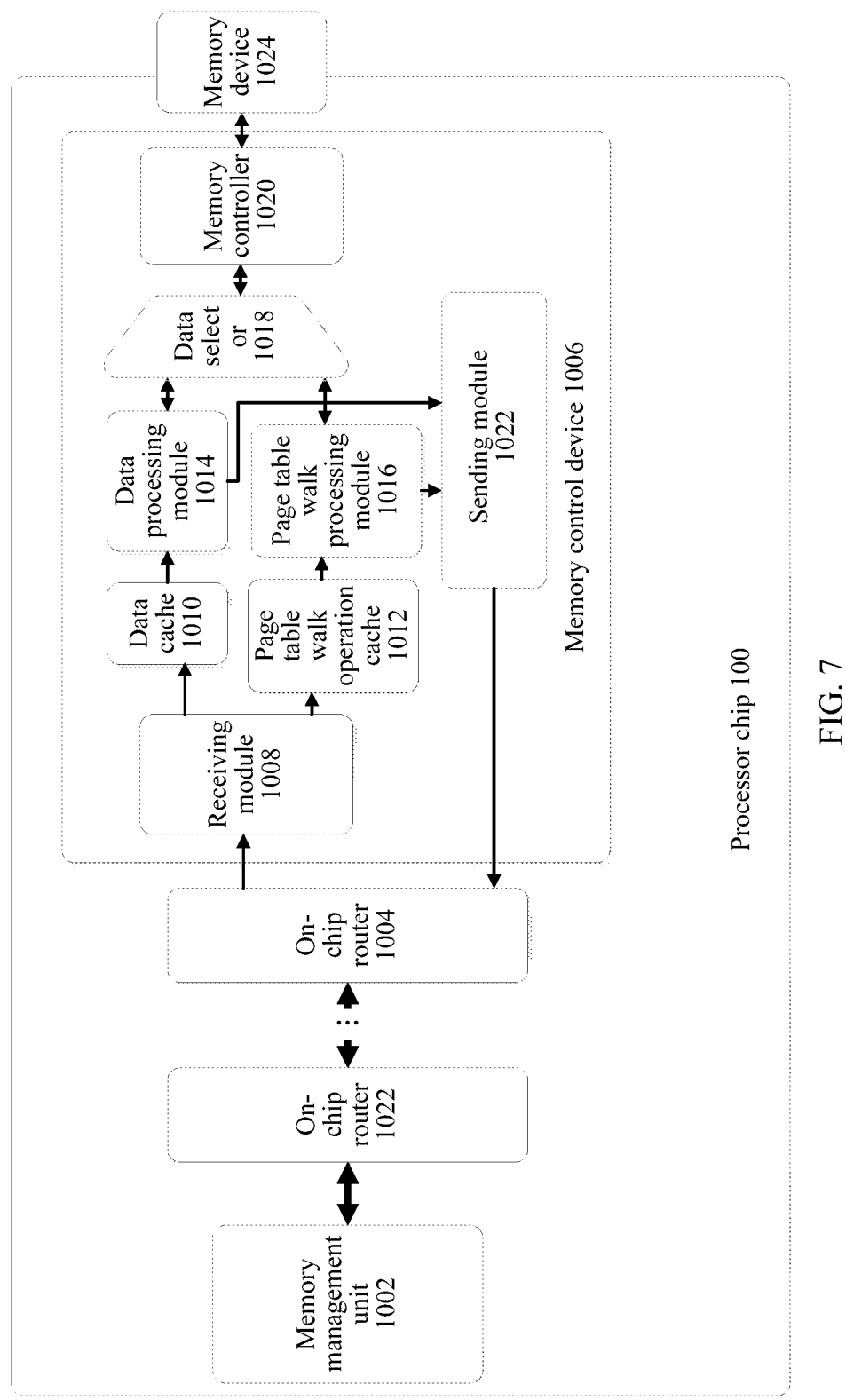
FIG. 7 is a schematic structural diagram of a processor chip applied in device embodiment 3 of the present invention.

Optionally, as shown in FIG. 6, if the data packet further includes priority information and the page table walk operation identifier, the memory control device 800 further includes a page table walk operation cache 808. After determining, according to the page table walk operation identifier, that the data packet is used to execute a page table walk operation, the receiving module 802 sends the priority information, the virtual address, and the page table base address to the page table walk operation cache 808 for storage. The processing module 804 determines, according to each piece of priority information stored in the page table walk operation cache 808, a virtual address and a page table base address that are corresponding to priority information with a highest priority, and executes the page table walk operation.

This device embodiment provides a memory control device. After receiving a data packet including content required for executing a page table walk operation, the memory control device executes the page table walk operation, so that multiple times of access to a page table in a process of the page table walk operation only need to be completed between the memory control device and a memory device outside a chip. Multiple interactions do not need to be performed between a memory management unit and the memory control device, thereby lightening a communication burden on the chip. Moreover, efficiency is also increased due to direct interaction between the memory control device and the memory device, and completion of the page table walk operation is speeded up, thereby helping improve overall efficiency of the page table walk operation.

Device Embodiment 3

Device embodiment 3 of the present invention provides a processor chip that includes any optional memory management unit in device embodiment 1, and that further includes any optional memory control device in device embodiment 2, and at least one on-chip router configured to establish a communication connection between the memory control device and the memory management unit.

During actual running of the processor chip, first, the memory management unit receives a virtual address, and after a TLB miss occurs, sends information required for executing a page table walk operation to the on-chip router, and the on-chip router sends the required information to the corresponding memory control device. Then, after receiving a data packet that carries the information required for executing a page table walk operation, the memory control device executes the page table walk operation according to the information that is required for executing a page table walk operation and that is carried in the data packet, to obtain a physical address, and packs the physical address into a packet and sends the packet to the on-chip router. After the on-chip router routes the data packet to the memory management unit, the memory management unit may update a translation look-aside buffer according to the physical address. For specific implementation details of the process, refer to method embodiments 1 and 2 and device embodiments 1 and 2. Details are not described herein again.

This embodiment describes an optimized working procedure of a processor chip 1000. The processor chip 1000 includes a memory management unit 1002, at least two on-chip routers, that is, an on-chip router 1004 and an on-chip router 1022, and a memory control device 1006.

Step 1: The memory management unit 1002 receives a virtual address A, and queries a translation look-aside buffer according to the virtual address A, and a TLB miss occurs. For details, refer to step 202 and step 204 in method embodiment 1.

Step 2: The memory management unit 1002 generates a page table walk operation identifier, reads a page table base address register to obtain a page table base address, and obtains, according to the page table base address, an ID of a memory control device corresponding to the page table base address. In this example, it is assumed that the memory control device 1006 is the memory control device corresponding to the page table base address. For details, refer to step 208 in method embodiment 1.

Step 3: The memory management unit 1002 obtains an ID of a thread that sends the virtual address, priority information corresponding to the thread, and an ID of a processor corresponding to the memory management unit 1002, and sends, to the on-chip router 1022, these pieces of information together with the virtual address, the page table base address, and the ID of the memory control device. Specifically, the foregoing information may be sent in a form of a data packet, and for a structure of the data packet, refer to Table 2. For details, refer to step 210 and optional steps before step 210 in method embodiment 1.

Step 4: The on-chip router 1022 and another on-chip router route, to the on-chip router 1004 according to the ID of the memory control device, the data packet that carries the foregoing information, and the on-chip router 1004 sends the data packet to the memory control device 1006.

Step 5: The memory control device 1006 receives the data packet. A receiving module 1008 first determines, according to the page table walk operation identifier carried in the data packet, that the data packet is used to execute a page table walk operation, then parses the data packet, and stores content of the data packet into a page table walk operation cache 1012. Correspondingly, if an identifier that is carried in a data packet received by the receiving module 1008 indicates that the data packet is a normal data read/write operation packet, the receiving module 1008 parses the data packet and stores the data packet into a data cache 1010. Because the normal data read/write operation is different from the page table walk operation, herein two different caches may be used to store content of the data packets. In practice, one cache may also be used, and different operation types are distinguished during processing. The content of the data packet stored in the page table walk operation cache 1012 is shown in Table 4. For details, refer to step 402 and an optional step of step 402 in method embodiment 2.

Step 6: A page table walk processing module 1016 selects, according to priority information that is stored in the page table walk operation cache 1012 and that is corresponding to information about each page table walk operation to be processed, a page table walk operation with a highest priority for processing. It should be noted that, in practice, priority selection may also be performed in both the page table walk operation cache 1012 and the data cache 1010. Because both a page table walk operation processing module 1016 and a data processing module 1014 may be ready to process respective operations, a data selector (Multiplexer) 1018 selects one of the two modules to interact with a memory controller 1020. Moreover, it should be noted that, herein, a function of the memory controller 1020 is similar to that of a conventional memory controller, that is, a conventional memory controller is integrated in the memory control device 1006 in this device embodiment. Moreover, herein, the page table walk processing module 1016, the data selector 1018, and the memory controller 1020 may be integrated in the processing module 804 in device embodiment 2. In practice, the three modules may also be deployed separately.

Step 7: The page table walk processing module 1016 accesses the memory controller 1020 by using the data selector 1018, completes the page table walk operation according to the virtual address A stored in the page table walk operation cache 1012 and the corresponding page table base address, and obtains a physical address B corresponding to the virtual address A. For details, refer to step 404 in method embodiment 2.

Step 8: The page table walk operation processing module 1016 generates a page table walk operation complete identifier, and sends, to a sending module 1022, the page table walk operation complete identifier together with the physical address B, the ID of the processor and the ID of the thread that are carried in the data packet corresponding to the virtual address A, and the sending module 1022 encapsulates the page table walk operation complete identifier, the ID of the processor, the ID of the thread, and the physical address B into a data packet and sends the data packet to the on-chip router 1004. For a structure of the data packet, refer to Table 3.

Step 9: The on-chip router 1004 and another on-chip router route the data packet to the on-chip router 1022 according to the ID of the processor carried in the data packet, and the on-chip router 1022 sends the data packet to the memory management unit 1002.

Step 10: After receiving the data packet, the memory management unit 1002 determines, according to the page table walk operation complete identifier, that the data packet is used to update the translation look-aside buffer, parses the data packet to obtain the virtual address A and the physical address B that are carried in the data packet, and completes updating of the translation look-aside buffer according to the virtual address A and the physical address B. For details, refer to step 214 in method embodiment 1.

Step 11: After completing updating of the translation look-aside buffer, the memory management unit 1002 activates an ID of the thread according to the ID that is of the thread and that is carried in the data packet, so that when a TLB miss occurs in step 1, a thread that is suspended because the thread cannot continue to be executed can continue to be executed. In this case, the thread needs to access a physical address corresponding to the virtual address. Because updating of the translation look-aside buffer is completed, a TLB hit definitely occurs in access of the translation look-aside buffer this time. Therefore, the thread can continue to be executed.

This device embodiment provides a processor chip. If a memory management unit on the processor chip receives a virtual address and a TLB miss occurs, the memory management unit sends information required for executing a page table walk operation to a corresponding memory control device, and the corresponding memory control device completes the page table walk operation, so that the page table walk operation is executed by only the memory control device on the processor chip instead of being executed by memory management units corresponding to processor cores, thereby reducing a burden caused to an on-chip communications network because the memory management units of the multiple processor cores all need to send a data packet multiple times when a multiple-level page table needs to be queried. Moreover, because a quantity of times of communication between the memory management unit and the memory control device is reduced, and instead, the memory control device completes multiple times of access to a memory device outside the chip, completion of the page table walk operation is also speeded up, thereby helping improve overall efficiency of the page table walk operation.

In the foregoing embodiments, the description of each embodiment has respective focuses. For a part that is not described in detail in an embodiment, reference may be made to related descriptions in other embodiments. It should be noted that, implementation details in method embodiment 1 and functions of the memory management unit in device embodiment 1 are essentially the same, and implementation details in method embodiment 2 and functions of the memory control device in device embodiment 2 are essentially the same. The devices described in device embodiment 1 and device embodiment 2 are integrated on a processor chip to form device embodiment 3. Therefore, technical details between the three may refer to each other.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A processor chip comprising:
   a memory management unit;
   a memory control device; and
   an on-chip router, wherein the on-chip router is configured to establish a communication connection between the memory control device and the memory management unit,
   wherein the memory management unit is configured to:
     receive a virtual address;
     obtain priority information of a thread corresponding to the virtual address;
     determine that the virtual address does not hit a translation look-aside buffer;
     read a page table base address from a page table base address register;
     determine, according to the page table base address, that the memory control device corresponds to the page table base address;
     encapsulate the virtual address, the page table base address, and the priority information into a first data packet, wherein the priority information indicates a processing priority of the first data packet;
     send the first data packet to the memory control device;
     receive, from the memory control device, a second data packet carrying a physical address corresponding to the virtual address; and
     update the translation look-aside buffer according to the physical address corresponding to the virtual address; and
   wherein the memory control device is configured to:
     receive, from the memory management unit, the first data packet;
     execute a page table walk operation, according to the virtual address, the page table base address, and the priority information, to obtain the physical address corresponding to the virtual address;
     encapsulate the physical address into the second data packet; and
     send, to the memory management unit, the second data packet.

2. The processor chip according to claim 1, wherein the memory management unit is further configured to:
   generate a page table walk operation identifier; and
   encapsulate the page table walk operation identifier into the first data packet.

3. The processor chip according to claim 1, wherein the memory control device is further configured to:
   generate a page table walk operation complete identifier; and encapsulate the page table walk operation complete identifier into the second data packet.

4. The processor chip according to claim 1, wherein:
the memory management unit is further configured to:
   obtain a thread ID of the thread corresponding to the virtual address;
   encapsulate the thread ID into the first data packet; and
   activate the thread indicated by the thread ID; and
the memory control device is further configured to:
   encapsulate the thread ID into the second data packet.

5. A method, comprising:
receiving, by a memory management unit, a virtual address;
obtaining, by the memory management unit, priority information of a thread corresponding to the virtual address;
determining, by the memory management unit, that the virtual address does not hit a translation look-aside buffer;
reading, by the memory management unit, a page table base address from a page table base address register;
determining, by the memory management unit, according to the page table base address, a memory control device corresponding to the page table base address;
encapsulating, by the memory management unit, the virtual address, the page table base address, and the priority information into a first data packet, wherein the priority information indicates a processing priority of the first data packet;
sending, by the memory management unit, the first data packet to the memory control device;
receiving, by the memory management unit, from the memory control device, a physical address corresponding to the virtual address, wherein the physical address is obtained by the memory control device by executing a page table walk operation according to the virtual address, the page table base address, and the priority information; and
updating, by the memory management unit, the translation look-aside buffer according to the physical address corresponding to the virtual address.

6. The method according to claim 5, further, comprising:
generating, by the memory management unit, and before encapsulating the first data packet, a page table walk operation identifier, wherein encapsulating the first data packet further comprises encapsulating the page table walk operation identifier into the first data packet.

7. The method according to claim 5, further comprising:
obtaining, by the memory management unit, and before encapsulating the first data packet, a thread ID of the thread corresponding to the virtual address, wherein encapsulating the first data packet further comprises encapsulating, by the memory management unit, the thread ID corresponding to the virtual address into the first data packet.

8. The method according to claim 7, wherein receiving the physical address comprises:

receiving, by the memory management unit, from the memory control device, a second data packet, wherein the second data packet carries the physical address corresponding to the virtual address.

9. The method according to claim 8, wherein updating the translation look-aside buffer further comprises:
confirming, by the memory management unit, according to a page table walk operation complete identifier, that the second data packet comprises an indication to update the translation look-aside buffer.

10. The method according to claim 8, further comprising:
activating, by the memory management unit, the thread indicated by the thread ID, wherein the second data packet further carries the thread ID.

11. A method, comprising:
receiving, by a memory control device, from a memory management unit, a first data packet carrying a virtual address, a page table base address, and priority information, wherein the priority information indicates a processing priority of the first data packet;
executing, by the memory control device, a page table walk operation, according to the virtual address, the page table base address, and the priority information, to obtain a physical address corresponding to the virtual address; and
sending, by the memory control device, to the memory management unit, the physical address corresponding to the virtual address.

12. The method according to claim 11, wherein executing the page table walk operation further comprises:
confirming, by the memory control device, according to a page table walk operation identifier, that the first data packet comprises an indication to execute the page table walk operation, wherein the first data packet comprises the page table walk operation identifier.

13. The method according to claim 11, further comprising:
generating, by the memory control device, and before sending the physical address corresponding to the virtual address, a page table walk complete identifier, wherein sending the physical address corresponding to the virtual address further comprises encapsulating, by the memory control device, the physical address corresponding to the virtual address and the page table walk complete identifier into a second data packet and sending, by the memory control device, to the memory management unit, the second data packet.

14. The method according to claim 11, wherein:
the first data packet further comprises a thread ID of a thread corresponding to the virtual address; and
sending the physical address comprises:
   encapsulating, by the memory control device, the physical address corresponding to the virtual address and the thread ID into a second data packet; and
   sending, by the memory control device, to the memory management unit, the second data packet.

* * * * *